US011258267B1

(12) United States Patent
Cheng et al.

(10) Patent No.: US 11,258,267 B1
(45) Date of Patent: Feb. 22, 2022

(54) OFF-GRID SOLAR SYSTEM WITH ASSISTED AC POWER

(71) Applicant: CYBOENERGY, INC., Rancho Cordova, CA (US)

(72) Inventors: George Shu-Xing Cheng, Folsom, CA (US); Steven L. Mulkey, Cameron Park, CA (US); Andrew J. Chow, Sacramento, CA (US)

(73) Assignee: CyboEnergy, Inc., Rancho Cordova, CA (US)

( * ) Notice: Subject to any disclaimer, the term of this patent is extended or adjusted under 35 U.S.C. 154(b) by 0 days.

(21) Appl. No.: 16/548,530

(22) Filed: Aug. 22, 2019

Related U.S. Application Data (60) Provisional application No. 62/721,498, filed on Aug. 22, 2018.

(51) Int. Cl.
*H02J 3/46* (2006.01)

(52) U.S. Cl.
CPC .................... *H02J 3/46* (2013.01)

(58) Field of Classification Search
CPC ....... H02J 3/385; H02J 3/46; H01L 31/02021; H02M 7/48
See application file for complete search history.

(56) References Cited

U.S. PATENT DOCUMENTS

| | | | |
|---|---|---|---|
| 6,134,124 A * | 10/2000 | Jungreis | H02J 3/32 363/34 |
| 8,786,133 B2 | 7/2014 | Cheng et al. | |
| 8,909,033 B2 | 12/2014 | Kreutzman | |
| 8,994,218 B2 | 3/2015 | Cheng et al. | |
| 9,331,489 B2 | 5/2016 | Cheng et al. | |
| 2011/0012430 A1 | 1/2011 | Cheng et al. | |
| 2012/0104872 A1 * | 5/2012 | Marroquin | H01L 31/02021 307/147 |
| 2012/0212065 A1 | 8/2012 | Cheng et al. | |
| 2012/0313443 A1 | 12/2012 | Cheng et al. | |
| 2013/0021006 A1 * | 1/2013 | Fornage | H02J 3/385 323/234 |
| 2013/0099575 A1 | 4/2013 | Loubier | |
| 2014/0077609 A1 | 3/2014 | Fornage | |
| 2016/0064937 A1 * | 3/2016 | Omar | H02J 3/383 307/52 |
| 2017/0310114 A1 * | 10/2017 | Veeraraghavan | H02J 3/46 |

* cited by examiner

*Primary Examiner* — Daniel Cavallari
(74) *Attorney, Agent, or Firm* — Donald E. Stout; Stout, Uxa & Buyan, LLP (57) ABSTRACT

A method and apparatus is disclosed relating to smart Microgrids or off-grid solar systems with grid power integration supported by AC assisted off-grid power inverters that can (1) intelligently and selectively pull power from one or multiple DC sources including solar panels, wind generators, and batteries based on certain criteria; (2) invert DC power to AC power as generated AC power; (3) intelligently pull power from a connected AC source including grid AC, a gas generator, or a wind generator as input AC power; (4) combine the generated AC power with the input AC power; (5) supply the combined AC power, or the generated AC power, or the input AC power to an off-grid circuit to power various types of AC loads; (6) send no power to the connected AC source; (7) maximize DC power production; (8) minimize the consumption of input AC power; and (9) achieve good system performance under DC and AC power variations and load changes.

14 Claims, 7 Drawing Sheets

OFF-GRID SOLAR SYSTEM WITH ASSISTED AC POWER

The subject of this patent relates to renewable electric power generation and DC (direct current) to AC (alternating current) power inverters that invert DC power from single or multiple DC sources to single-phase or three-phase AC power, where the DC sources include but are not limited to photovoltaic (PV) solar modules or panels, PV cells, PV materials, PV thin films, fuel cells, batteries, wind generators, bio-fuel generators, and other DC power generators. More particularly, this patent relates to smart microgrids or off-grid solar systems with grid power integration supported by AC assisted off-grid power inverters that can (1) intelligently and selectively pull power from one or multiple DC sources including solar panels, wind generators, and batteries based on certain criteria; (2) invert DC power to AC power as generated AC power; (3) intelligently pull power from a connected AC source including an electrical grid, a gas generator, or a wind generator as input AC power; (4) combine the generated AC power with the input AC power; (5) supply the combined AC power, or the generated AC power, or the input AC power to an off-grid circuit to power various types of AC loads; (6) send no power to the connected AC source; (7) maximize DC power production; (8) minimize the consumption of input AC power; and (9) achieve good system performance under DC and AC power variations and load changes.

In U.S. Pat. No. 8,786,133, the entirety of which is hereby incorporated by reference, we described the novel Smart and Scalable Power Inverters and the unique scalable design so that the DC to AC power inversion system can include as few as one inverter and one DC source, up to a selected number of inverters and multiple DC sources. A number of smart single-input, dual-input, triple-input, quad-input, and multiple-input power inverters in a mixed variety can easily connect to single, dual, triple, quad, and multiple DC power sources, invert the DC power to AC power, and daisy chain together to generate a total power, which is equal to the summation of the AC power supplied by each smart and scalable power inverter.

In U.S. Pat. No. 8,994,218, the entirety of which is hereby incorporated by reference, we described the Smart and Scalable Off-Grid Mini-Inverters having one or multiple DC input channels that can invert DC power to AC power, and supply AC power to power electrical devices including motors, pumps, fans, lights, appliances, and homes.

In U.S. Pat. No. 9,172,270, the entirety of which is hereby incorporated by reference, we described a method and apparatus for solar power generation when irradiance changes quickly or is very low due to sunrise, sunset, clouding, partial shading, warped PV surfaces, moving solar modules, and other low or varying irradiance conditions. A multi-channel solar power inverter connected to multiple solar modules can work in a "Lunar Power Mode", inverting DC power induced from the sky, street lights, or surrounding environment to AC power.

In U.S. Pat. No. 9,899,84, the entirety of which is hereby incorporated by reference, we described a method and apparatus that can intelligently invert DC power from single or multiple DC sources to single-phase or three-phase AC power, supply the AC power to the electric electrical grid when the grid is on, or supply AC power to electric devices or loads when the grid is down. A Smart and Grid flexible Power Inverter, or On/Off-Grid Power Inverter, is disclosed that can work in either the on-grid or off-grid mode, and switch back and forth between the two modes manually or automatically depending on the electrical grid conditions.

In U.S. Pat. No. 9,906,038, the entirety of which is hereby incorporated by reference, we described a smart renewable power generation system with grid and DC source flexibility that can (1) intelligently and selectively pull power from one or multiple DC sources based on certain criteria; (2) invert DC power to AC power; (3) supply the AC power to the electrical grid or to an off-grid electric circuit to power AC loads; (4) supply DC power through one or multiple DC output ports to power DC loads; and (5) charge batteries. Various types of on-grid, off-grid, and on/off-grid DC flexible power inverters are described to demonstrate the innovation for delivering flexible, cost-effective, and user-friendly power generation systems to harvest any form of renewable energy available and convert it to usable electricity.

In U.S. Pat. No. 9,871,379, the entirety of which is hereby incorporated by reference, we described smart microgrids supported by dual-output off-grid power inverters with DC source flexibility that can (1) intelligently and selectively pull power from one or multiple DC sources including solar panels, wind generators, and batteries based on certain criteria; (2) invert DC power to AC power; (3) supply the AC power to two off-grid circuits individually to power various types of AC loads that require different AC voltages, power quality, and power levels; (4) supply DC power through one or multiple DC output ports to power DC loads; and (5) charge batteries.

In this patent, we describe battery-less off-grid solar systems with assisted AC power supplied by an electrical grid or by an AC source for the areas where on-grid solar systems are no longer welcomed and for many parts of the world where there is no electrical grid.

The term "mechanism" is used herein to represent hardware, software, or any combination thereof. The term "solar panel" or "solar module" refers to photovoltaic (PV) solar modules. The term "AC load" is used herein to represent one or more single-phase or three-phase electrical devices including but not limited to electric heating elements, water heaters, air-conditioners, inverter-air-conditioners (IAC), motors, pumps, fans, lights, battery chargers, appliances, and homes.

Throughout this document, m=1, 2, 3, . . . , as an integer, which is used to indicate the number of the DC input ports of an inverter. The term "input channel" refers to the DC input port of the inverter. Then, an m-channel inverter means that the inverter has m input channels or m DC input ports. The term "m-channel inverter" refers to an inverter that has m input channels, where m=1, 2, 3, . . . , as an integer.

Throughout this document, n=1, 2, 3, . . . , as an integer, which is used to indicate the number of inverters that daisy chain in the same off-grid solar system.

Throughout this document, a DC source can be in any one of the following forms including a solar panel or a set of solar panels combined in series and/or parallel, a battery or a set of batteries combined in series and/or parallel, a fuel cell or a set of fuel cells combined in series and/or parallel, a wind generator, and other types of DC power generators.

Throughout this document, if a power inverter is used to generate single-phase AC, it can also be applied to three-phase AC without departing from the spirit or scope of our invention. If a solar inverter is used to generate three-phase AC, it can also be applied to single-phase AC without departing from the spirit or scope of our invention. The AC power and related electrical grid and AC load can be either single-phase, split-phase, or three-phase.

Without losing generality, all numerical values given in this patent are examples. Other values can be used without departing from the spirit or scope of our invention. The description of specific embodiments herein is for demonstration purposes and in no way limits the scope of this disclosure to exclude other not specifically described embodiments of this invention.

DESCRIPTION

While this patent is being written, the solar industry has reached a critical stage facing two major obstacles. In areas such as Hawaii, California, United Kingdom, and Southern Europe where the electrical grid has reached its capacity limitations, on-grid solar systems are no longer welcomed. At the same time, there are about 2 billion people in the world having no electricity. In both situations, off-grid solar systems can be very useful.

In traditional off-grid solar systems, batteries are a necessity. Batteries are heavy, costly, and need maintenance. A battery-less off-grid solar system stands out as a favorable alternative. Battery-less off-grid solar systems supported by off-grid solar inverters such as those described in U.S. Pat. Nos. 8,994,218 and 9,871,379 can pull DC power from solar panels directly, invert the DC to AC, and send power to an off-grid circuit to power AC loads. Although these systems can work most of the time under sunlight variations, the performance is still dependent on the available DC power. They will not operate in the evening and may not be able to run the loads in raining or cloudy days.

In this patent, we describe battery-less off-grid solar systems with assisted AC power supplied by an electrical grid or by an AC source. The AC assisted off-grid power inverters in this invention can overcome the challenges of battery-less off-grid solar systems and provide stable performance under DC and AC power variations and load changes.

Figure 1:
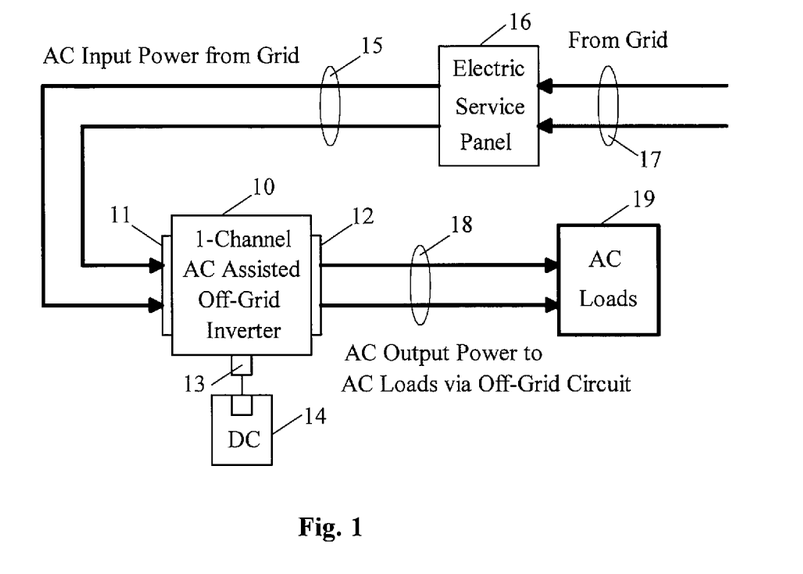
FIG. 1 is a block diagram illustrating an off-grid solar power system with grid power integration where one single-channel AC assisted off-grid power inverter inverts the DC power from one DC source to AC power, combines its generated AC power with the input AC power from an electrical grid, and sends the combined AC power to an off-grid AC circuit to power AC loads, according to an embodiment of this invention.

FIG. 1 is a block diagram illustrating an off-grid solar power system with grid power integration where one single-channel AC assisted off-grid power inverter inverts the DC power from one DC source to AC power, combines its generated AC power with the input AC power from an electrical grid, and sends the combined AC power to an off-grid AC circuit to power AC loads, according to an embodiment of this invention.

The system comprises a single-channel AC assisted off-grid power inverter 10, an inverter's AC power input port 11, an inverter's off-grid AC power output port 12, an inverter's DC input channel 13, a DC power source such as a solar panel 14, an input AC powerline 15, an electric service panel 16, an AC powerline connected to an electrical grid 17, an off-grid AC powerline 18, and AC loads 19. The power inverter 10 connects to the DC power source 14 through its DC input channel 13. The grid AC is connected to inverter's AC power input port 11 via the input AC powerline 15. The inverter's off-grid AC output port 12 is connected to AC loads 19 via the off-grid AC powerline 18. This is a simple case of an off-grid solar system with grid power integration, where the off-grid power inverter takes DC power from the DC power source, inverts the DC power to AC power, combines its generated AC power with input AC power from the grid, and sends the combined AC power to an off-grid AC circuit to power AC loads.

The DC source for the power inverter can be in any one of the following forms including a solar panel or a set of solar panels combined in series and/or parallel, a battery or a set of batteries combined in series and/or parallel, a fuel cell or a set of fuel cells combined in series and/or parallel, and a wind generator. The AC power and related electrical grid and AC loads in this embodiment and in the embodiments to be described in FIGS. 2 to 8 can be single-phase or 3-phase. The 2 AC wires in the drawing are there to show the concept and method.

Figure 2:
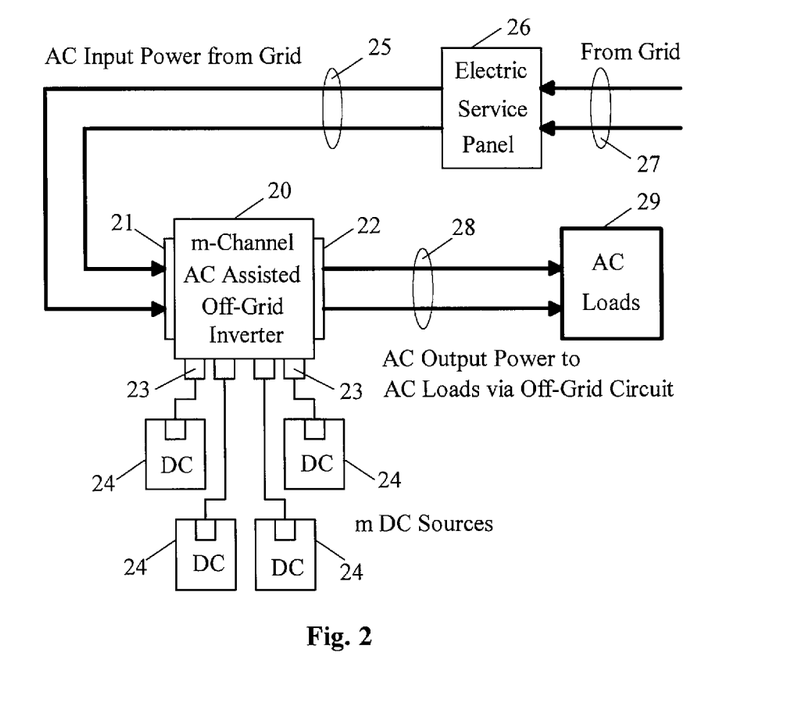
FIG. 2 is a block diagram illustrating an off-grid solar power system with grid power integration where one m-channel AC assisted off-grid power inverter inverts the DC power from multiple DC sources to AC power, combines its generated AC power with the input AC power from an electrical grid, and sends the combined AC power to an off-grid AC circuit to power AC loads, according to an embodiment of this invention.

FIG. 2 is a block diagram illustrating an off-grid solar power system with grid power integration where one m-channel AC assisted off-grid power inverter inverts the DC power from multiple DC sources to AC power, combines its generated AC power with the input AC power from an electrical grid, and sends the combined AC power to an off-grid AC circuit to power AC loads, according to an embodiment of this invention.

The system comprises an m-channel AC assisted off-grid power inverter 20, an inverter's AC power input port 21, an inverter's off-grid AC power output port 22, inverter's multiple DC input channels 23, m DC power sources such as solar panels 24, an input AC powerline 25, an electric service panel 26, an AC powerline connected to an electrical grid 27, an off-grid AC powerline 28, and AC loads 29. The power inverter 20 connects to the DC power sources 24 through its DC input channels 23, respectively. The grid AC is connected to inverter's AC power input port 21 via the input AC powerline 25. The inverter's off-grid AC output port 22 is connected to AC loads 29 via the off-grid AC powerline 28.

In the systems described in the embodiments of FIGS. 1 and 2, the grid AC power is used as a power source only. Although the inverter is connected to the electrical grid through its AC input port, the inverter does not send any power to the grid. The advantages of this system include the following: (1) it is a pure off-grid solar power system and does not send power to the grid, so it avoids all the special requirements and headaches of an on-grid solar system; (2) it can take grid power as an additional power source to help run AC loads when the system requires more power than the solar panels and the inverter can deliver; (3) the grid power can run the connected AC loads during the time when there is no solar power and the inverter is turned off; (4) the grid power can start AC loads such as motors and pumps that need a large mount of surge power that the off-grid inverter cannot provide; and (5) after the loads are started, the required power to run the loads is reduced so that the inverter with the solar panels may be able to run the AC loads without the need of having any AC power from the grid.

The off-grid solar power system with grid power integration can work in three different modes as described in the following:

Mode 1. Grid AC Only Mode. The input AC power from the grid can run the AC loads directly. In this case, the inverter is not even turned on. For instance, when the inverter is down at night, the AC loads can operate normally with the grid power.

Mode 2. Solar Only Mode. The AC input port of the inverter is not connected to the grid or the grid is down. In this case, the inverter will work like a regular off-grid inverter.

Mode 3. Combined Power Mode. The AC power generated by the inverter is combined with the input power from the grid, and the combined power runs the AC loads. In this case, solar production is maximized and grid power consumption is minimized. If solar has more power than the AC loads need, the system will not consume any grid power, and the inverter will reduce power production to assure that no power is sent to the grid.

Figure 3:
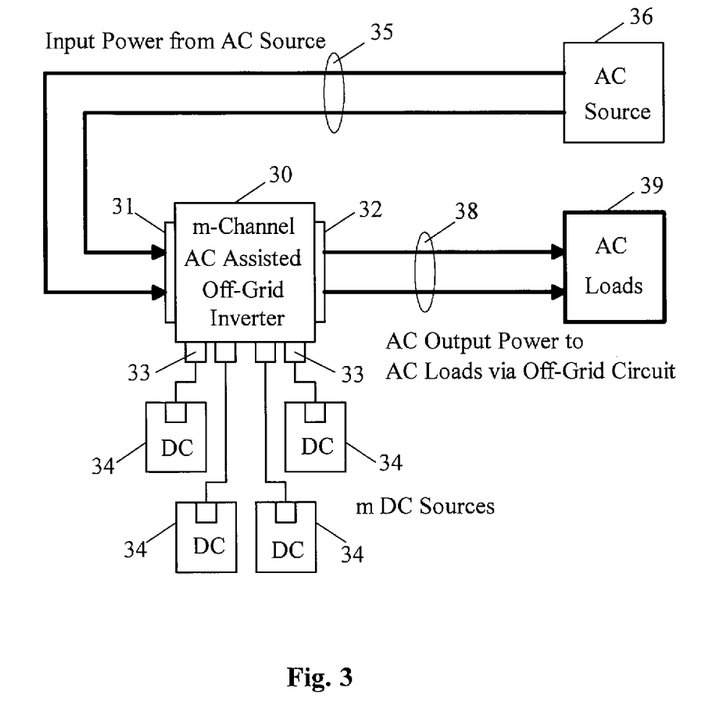
FIG. 3 is a block diagram illustrating an off-grid solar power system with AC power integration where one m-channel AC assisted off-grid power inverter inverts the DC power from multiple DC sources to AC power, combines its generated AC power with the input AC power supplied by an AC power source, and sends the combined AC power to an off-grid AC circuit to power AC loads, according to an embodiment of this invention.

FIG. 3 is a block diagram illustrating an off-grid solar power system with AC power integration where one m-channel AC assisted off-grid power inverter inverts the DC power from multiple DC sources to AC power, combines its generated AC power with the input AC power supplied by an AC power source, and sends the combined AC power to an off-grid AC circuit to power AC loads, according to an embodiment of this invention.

The system comprises an m-channel AC assisted off-grid power inverter 30, an inverter's AC power input port 31, an inverter's off-grid AC power output port 32, inverter's multiple DC input channels 33, m DC power sources such as solar panels 34, an input AC powerline 35, an AC source 36, an off-grid AC powerline 38, and AC loads 39. The power inverter 30 connects to the DC power sources 34 through its DC input channels 33, respectively. The AC source is connected to inverter's AC power input port 31 via the input AC powerline 35. The inverter's off-grid AC output port 32 is connected to AC loads 39 via the off-grid AC powerline 38.

In this system, the input AC power is supplied by an AC power source such as a gas generator or a wind generator. Although the inverter is connected to the AC source through its AC input port, the inverter does not send any power to the AC source. In fact, sending any AC power generated by the inverter can potentially damage the AC source. The advantages of this system include the following: (1) it is a pure off-grid solar power system with or without batteries; (2) it can take AC power from an AC source as an additional power source to help run AC loads when the system requires more power than the solar panels and the inverter can deliver; (3) the input AC power can run the connected AC loads during the time when there is no solar power and the inverter is turned off; (4) the input AC power can start AC loads such as motors and pumps that need a large mount of surge power that the off-grid inverter cannot provide; and (5) after the loads are started, the required power to run the loads is significantly reduced so that the inverter with the solar panels may be able to run without the need of having any AC power from the AC source.

The off-grid solar power system with AC power integration can work in three different modes as described in the following:

Mode 1. AC Source Only Mode. The input AC power from an AC source can go through the inverter and run the AC loads directly. In this case, the inverter is not even turned on. For instance, when the inverter is down at night, the AC loads can be powered by an AC source such as a gas generator.

Mode 2. Solar Only Mode. When the inverter is not connected to the AC source or the AC source is down, the inverter will work like a regular off-grid inverter.

Mode 3. Combined Power Mode. The AC power generated by the inverter is combined with the input power from the AC source, and the combined power runs the AC loads. In this case, solar production is maximized and power consumption from the AC source is minimized. On the other hand, if solar has more power than the AC loads need, the system will not consume any power from the AC source, and the inverter will reduce power production to assure that no power is sent to the AC source.

Figure 4:
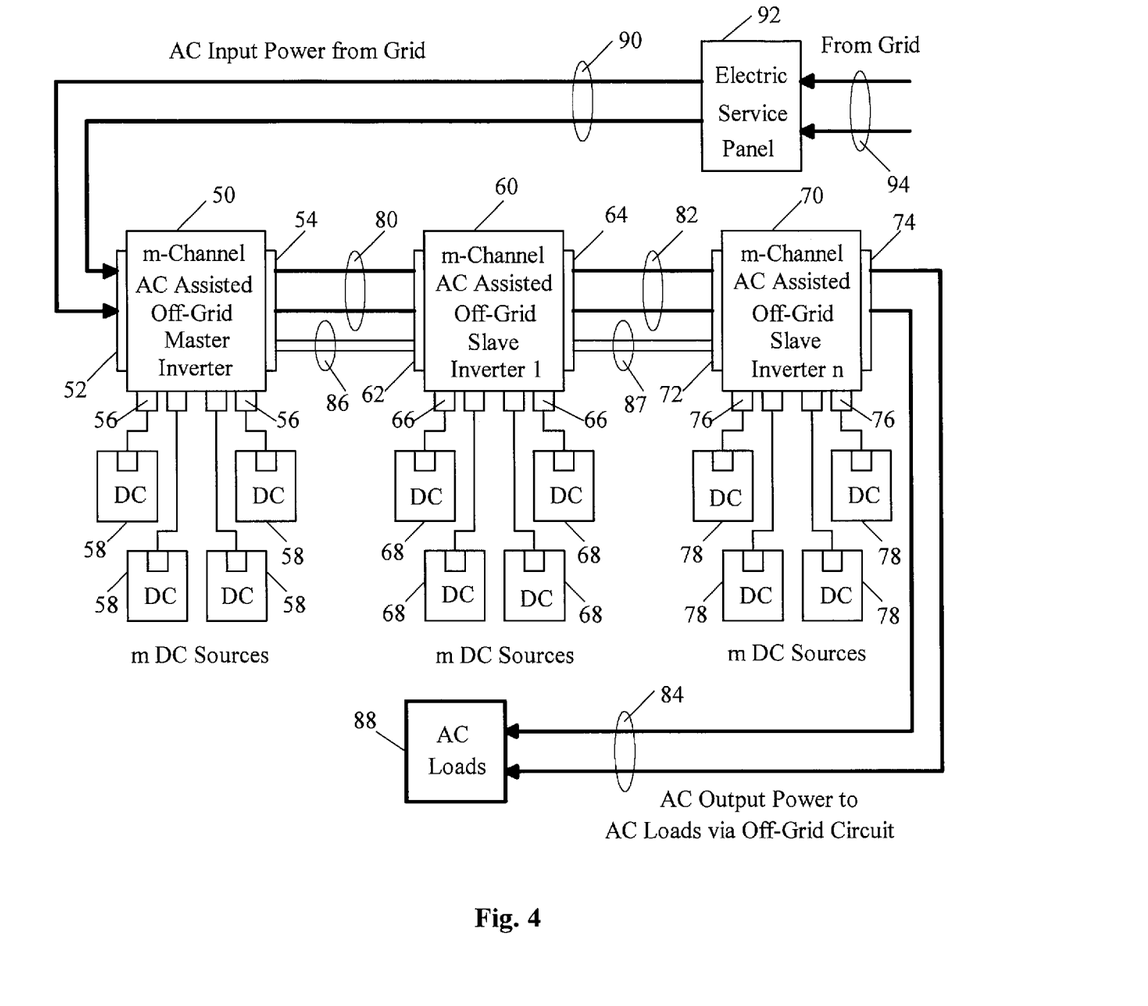
FIG. 4 is a block diagram illustrating an off-grid solar power system with grid power integration where one m-channel AC assisted off-grid master inverter and one or multiple m-channel AC assisted off-grid slave inverters daisy-chain to form a group, each of the inverters inverts the DC power from multiple DC sources to AC power, where the generated AC power from all inverters is combined with the input AC power from an electrical grid, and the total combined AC is sent to an off-grid AC circuit to power AC loads, according to an embodiment of this invention.

FIG. 4 is a block diagram illustrating an off-grid solar power system with grid power integration where one m-channel AC assisted off-grid master inverter and one or multiple m-channel AC assisted off-grid slave inverters daisy-chain to form a group, each of the inverters inverts the DC power from multiple DC sources to AC power, where the generated AC power from all inverters is combined with the input AC power from an electrical grid, and the total combined AC is sent to an off-grid AC circuit to power AC loads, according to an embodiment of this invention.

The system comprises an m-channel AC assisted off-grid power master inverter 50, an inverter's AC power input port 52, an inverter's off-grid AC power output port 54, inverter's multiple DC input channels 56, m DC power sources such as solar panels 58, an input AC powerline 90, an electric service panel 92, an AC powerline connected to an electrical grid 94, an off-grid AC powerline 80 connected to the AC input port 62 of the next off-grid slave inverter 60, and signal lines 86. The off-grid inverter 50 connects to the DC power sources 58 through its DC input channels 56, respectively.

The system further comprises one or multiple off-grid power slave inverters. It comprises an m-channel AC assisted off-grid power slave inverter 1, 60, an inverter's AC power input port 62, an inverter's off-grid AC power output port 64, inverter's multiple DC input channels 66, m DC power sources such as solar panels 68, an off-grid AC powerline 82 connected to the AC input port 72 of the next off-grid slave inverter 70, and signal lines 86. The signal lines 86 are used to connect the master inverter 50 with the slave inverter 60 for AC waveform synchronization and power level control and coordination. The off-grid inverter 60 connects to the DC power sources 68 through its DC input channels 66, respectively.

Without losing generality, the system further comprises an m-channel AC assisted off-grid power slave inverter n, 70, an inverter's AC power input port 72, an inverter's off-grid AC power output port 74, inverter's multiple DC input channels 76, m DC power sources such as solar panels 78, an off-grid AC powerline 84, AC loads 88, and signal lines 87. The signal lines 87 are used to connect the master inverter 50 with the slave inverter 70 via signal lines 86 for AC waveform synchronization and power level control and coordination. The off-grid inverter 70 connects to the DC power sources 78 through its DC input channels 76, respectively. In the system, n=1, 2, 3, . . . , as an integer, which is used to indicate the number of slave inverters that daisy chain with the master inverter in the same off-grid solar system. Then, inverter 70 is the nth slave inverter daisy chained in the system and its AC output port 74 is connected to the AC loads 88 through its output powerline 84. The total combined AC output power includes the AC input power from an electrical grid and the AC output power from each of the daisy-chained inverters. The total combined AC output power is sent to the AC loads through the AC output port 74.

Although we say the power inverters daisy chain, where the AC output port of each power inverter is connected to the AC input port of the next power inverter, the actual connection of the inverters is pass-through. That means, the generated AC power from each power inverter is added in parallel onto the AC powerline. In a physical design of an off-grid power inverter, the AC input port and AC output port can be constructed by using appropriate AC wires and connectors to make the installation user-friendly. For instance, the AC output port can use a male-type AC connector and the AC input port can use a female-type AC connector, making a matching pair. This way, the user can easily make the AC connections and avoid potential errors.

An alternative design can combine all off-grid AC outputs of all off-grid inverters to an AC junction box as long as the generated AC power from each power inverter is added in parallel onto the AC powerline.

The smart and scalable off-grid power inverters have been described in the U.S. Pat. No. 8,994,218, where multiple off-grid inverters can work together as a group, in which an AC master inverter is the "leading inverter" to generate AC power to the off-grid AC powerline to allow the other off-grid slave inverters connected to the same AC powerline to synchronize with the AC power being produced by the master inverter. A microgrid can have only one master inverter but multiple slave inverters. In this patent, the master inverter has an AC input port that can receive external AC power from an electric grid or an AC source.

The signal lines 86 and 87 are used to synchronize the actions and AC outputs of the master and slave inverters, control the power level to match the loads, and assure that the solar power is not sent to the grid or to the AC source.

Figure 5:
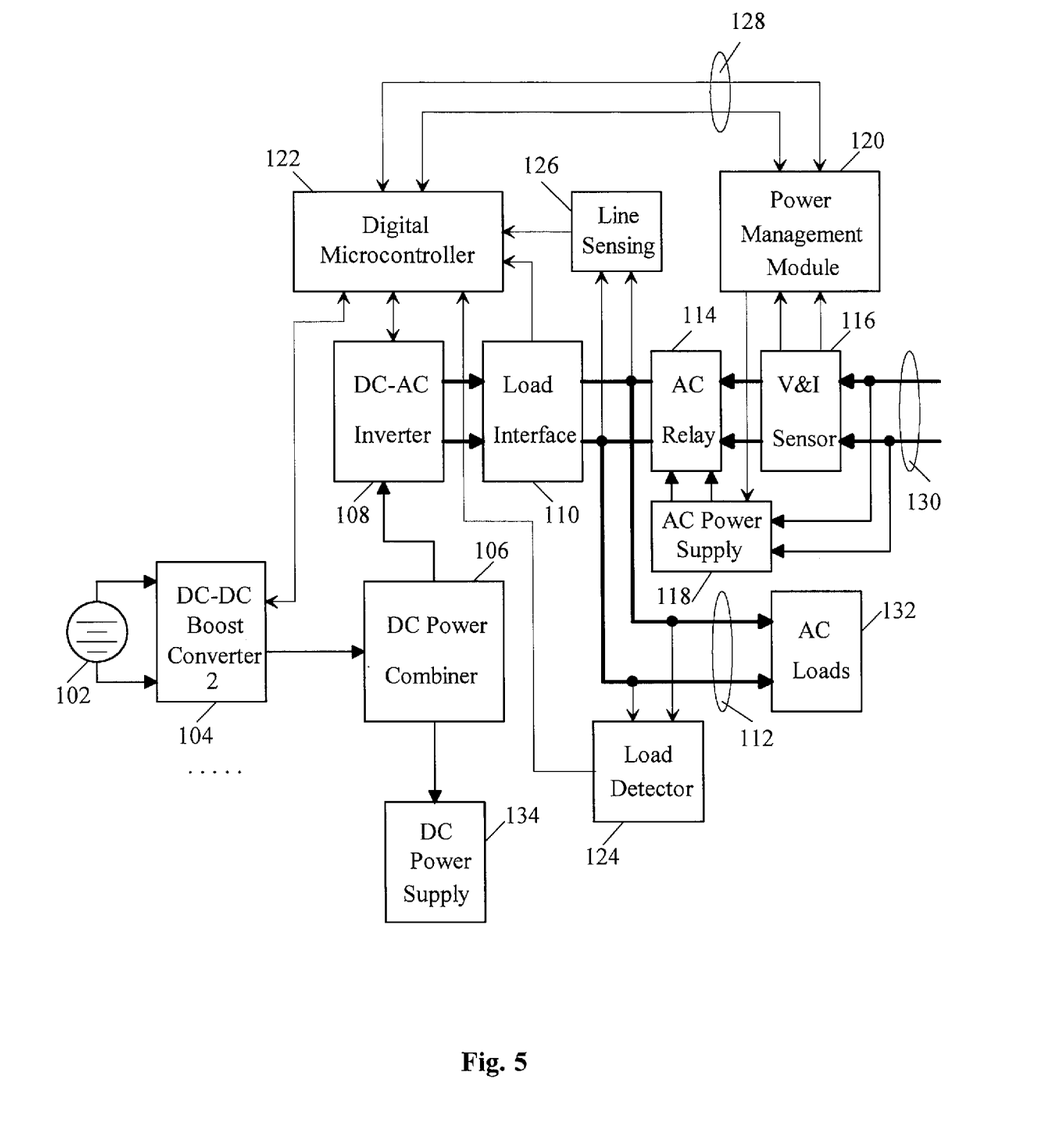
FIG. 5 is a block diagram illustrating a single-channel AC assisted off-grid power inverter that inverts the DC power from one DC source to AC power, combines its generated AC power with input AC power, and sends the combined AC power to an off-grid AC circuit to power AC loads, according to an embodiment of this invention.

FIG. 5 is a block diagram illustrating a single-channel AC assisted off-grid power inverter that inverts the DC power from one DC source to AC power, combines its generated AC power with input AC power, and sends the combined AC power to an off-grid AC circuit to power AC loads, according to an embodiment of this invention.

The single-channel AC assisted off-grid power inverter comprises a DC-DC boost converter 104, a DC power combiner 106, a DC-AC inverter 108, a load interface circuit 110, an off-grid AC output powerline 112, an AC electric relay 114, a voltage and current sensing circuit 116, an AC power supply 118, a power management module 120, a digital microcontroller 122, a load detector 124, a line sensing circuit 126, communication circuits and wires 128, an AC input port and powerline 130, and a DC power supply 134. The off-grid AC output powerline 112 is connected to an off-grid AC circuit and AC loads 132.

The AC electric relay 114 can be controlled by the microcontroller 122 through the power management module (PMM) 120 and AC power supply 118. The AC power supply 118 is used to supply power to energize or de-energize the AC relay 114, which can be controlled by the microcontroller 122 via the power management module 120. The relay is used to isolate the inverter's off-grid AC output powerline 112 from the AC input port and powerline 130. In Mode 1 (Grid AC Only Mode), the AC electric relay 114 is closed by the AC power supply 118 so that the grid AC can start and run the loads. In Mode 2 (Solar Only Mode), the inverter's input port is not connected to the grid AC or the grid is down, the AC electric relay 114 is open by the microcontroller 122 via PMM 120 and AC power supply 118. This is to protect the inverter's off-grid AC output powerline 112 by isolating it from the AC input port and powerline 130. In Mode 3 (Combined Power Mode), the AC electric relay 114 is closed by the microcontroller 122 via PMM 120 and AC power supply 118 so the AC power generated by the inverter and the input power from the grid can be combined to run the AC loads.

The line sensing circuit 126 connected to the off-grid AC output powerline 112 is used to detect if there is AC power on the off-grid AC output powerline 112. As an off-grid inverter, it will not generate power if AC is detected on the off-grid AC output powerline 112. This could happen if someone connects the off-grid inverter's output port to the grid. The line sensing circuit 126 is also used to measure the AC output voltage and current as real-time feedback signals for the inverter to regulate the AC output voltage. The line sensing circuit to be described in FIGS. 6 to 8 perform the similar functions.

The voltage and current sensor (V&I sensor) 116 and power management module (PMM) 120 are used to monitor the flow of AC current coming from the AC input port. In Mode 1 (Grid AC Only Mode), the V&I sensor 116 detects AC current flowing from the grid. In Mode 2 (Solar Only Mode), the V&I sensor detects no AC current flowing from the grid. In Mode 3 (Combined Power Mode), the V&I sensor 116 expects to measure zero or some AC current flowing from the grid. If the V&I sensor and PPM 120 sense that the AC current may flow to the grid, the inverter will reduce power production to assure that no power is sent to the grid. In this case, the AC current from the grid will be zero. The power management module (PMM) 120 communicates with the digital microcontroller 122 via communication circuits and wires 128. The communication circuits and wires to be described in FIGS. 6 and 7 perform the similar functions.

During normal operating conditions, the power from DC source 102 is delivered to DC-DC boost converter 104. The DC power goes through a DC power combiner 106 and then inverted by the DC-AC inverter 108 to AC power. In Mode 2 (Solar Only Mode), the AC power generated by the inverter goes through a load interface circuit 110 and runs the AC loads 132 through the off-grid AC output powerline 112. In Mode 3 (Combined Power Mode), the AC power generated by the inverter and the input power from the grid is combined and the combined power runs the AC loads 132 through the off-grid AC output powerline 112. The AC output voltage is regulated based on inverter's rated output voltage such as 120 VAC as well as the AC current flow direction monitored by the V&I sensor 116 and power management module 120. Since the input AC voltage from the grid should be close to the rated output voltage of the inverter and there should always be sufficient combined power to run the AC loads, the inverter can simply ramp up or down its generated power towards the goal of (1) maximizing solar power production and (2) minimizing the grid power consumption.

Figure 6:
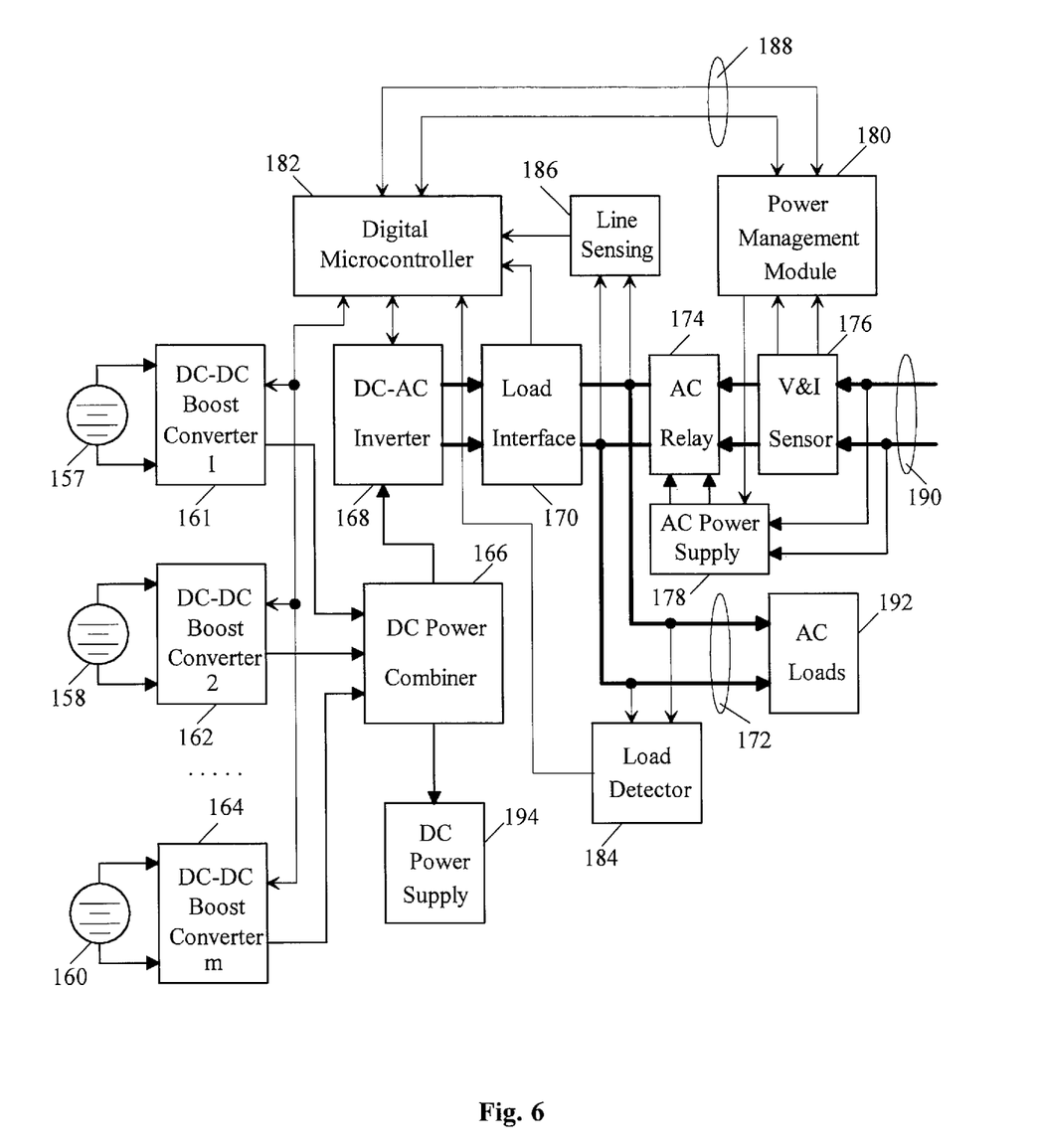
FIG. 6 is a block diagram illustrating an m-channel AC assisted off-grid power inverter that inverts the DC power from multiple DC sources to AC power, combines its generated AC power with input AC power, and sends the combined AC power to an off-grid AC circuit to power AC loads, according to an embodiment of this invention.
Figure 7:
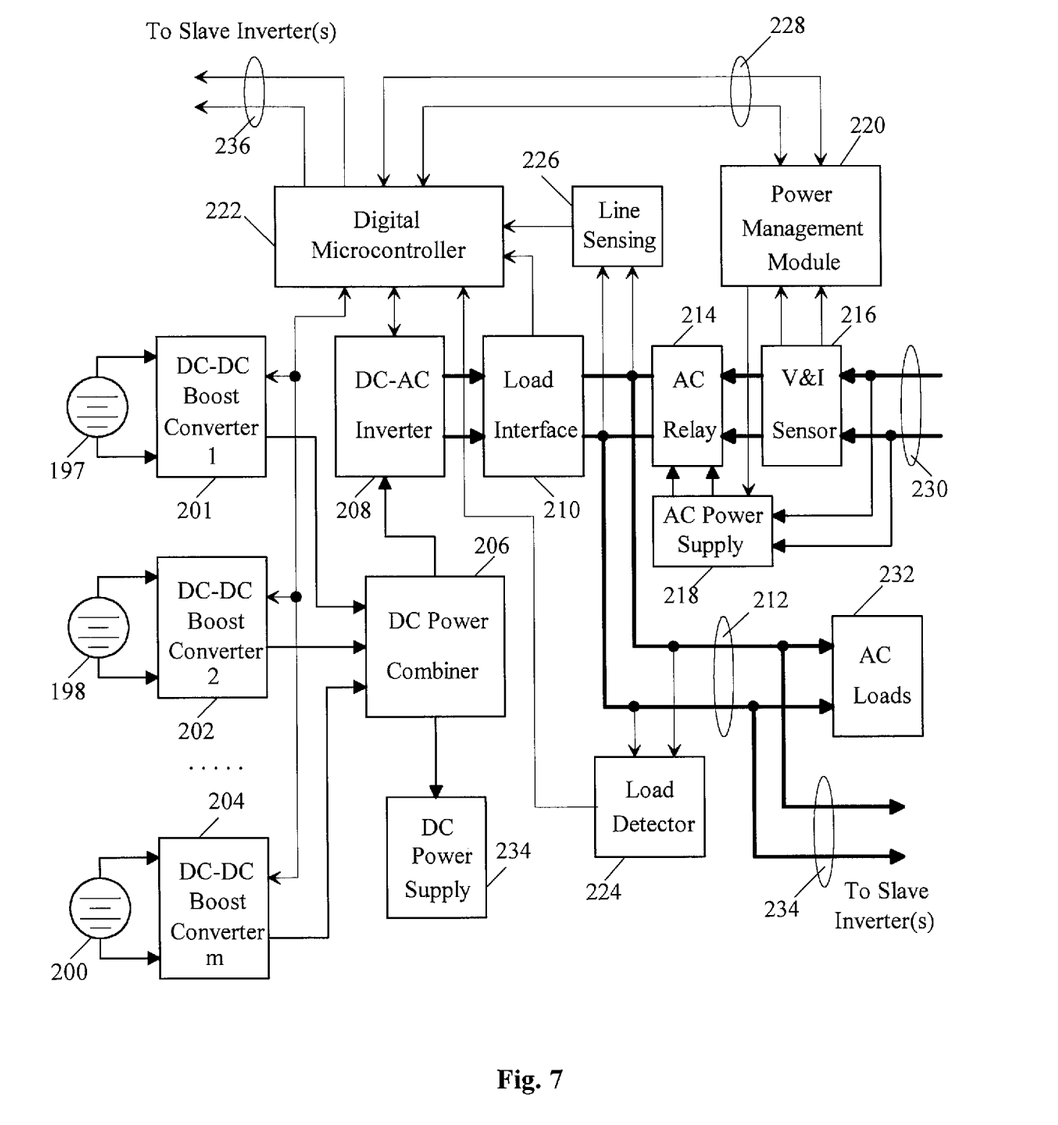
FIG. 7 is a block diagram illustrating an m-channel AC assisted off-grid master inverter that inverts the DC power from multiple DC sources to AC power, combines its generated AC power with input AC power, connects to one or multiple off-grid slave inverters through AC wires and signal lines, and sends the total combined AC power to an off-grid AC circuit to power AC loads, according to an embodiment of this invention.
Figure 8:
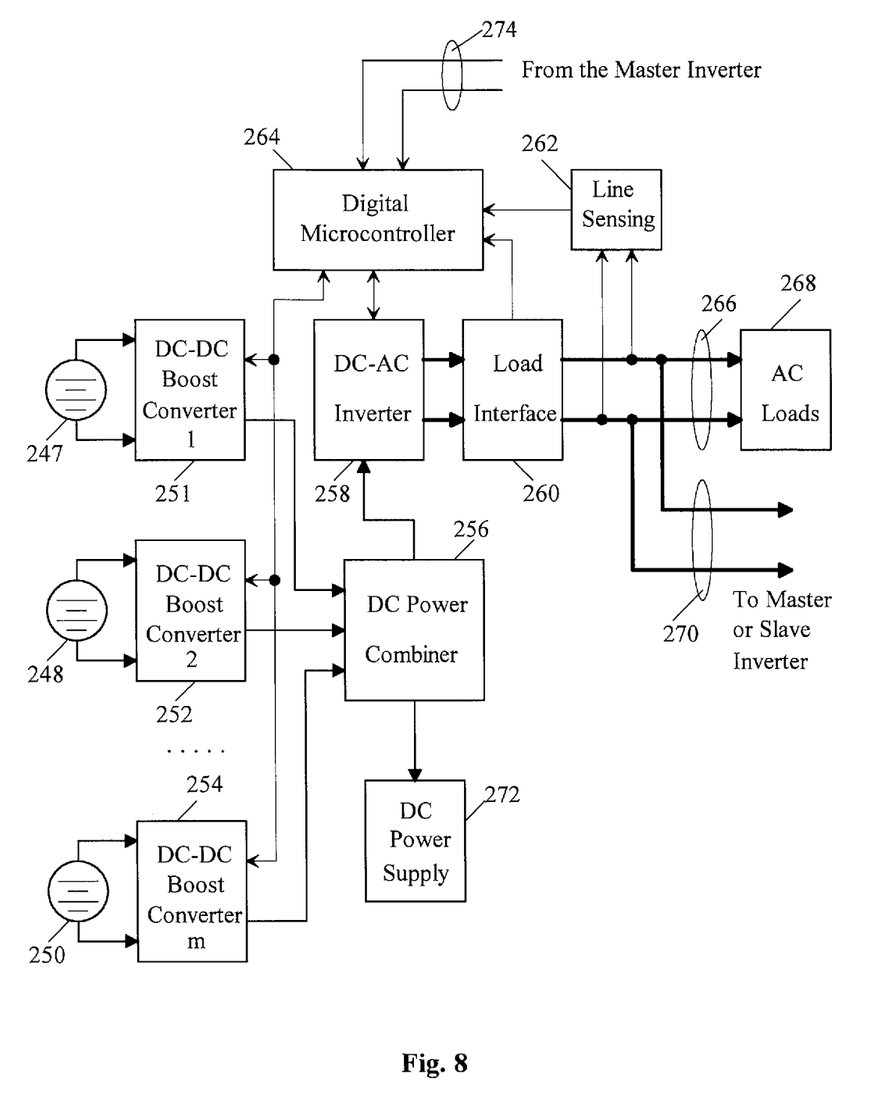
FIG. 8 is a block diagram illustrating an m-channel AC assisted off-grid slave inverter that inverts the DC power from multiple DC sources to AC power, connects to an off-grid master inverter through AC wires and signal lines, and provides its output AC power to an off-grid AC circuit to power AC loads along with the master inverter, according to an embodiment of this invention.

The digital microcontroller 122 as well as those described in FIGS. 6 to 8 are small computers on a single integrated circuit (IC) or a set of ICs that consists of a central processing unit (CPU) combined with functions and peripherals including a crystal oscillator, timers, watchdog, serial and analog I/Os, memory modules, pulse-width-modulation (PWM) generators, and all software programs. A 32-bit high-performance floating-point microcontroller is selected for this application.

The AC relay 114 as well as those to be described in FIGS. 6 and 7 are connect/disconnect devices such as electrical-mechanical relays, solid-state relays, silicon controlled rectifiers (SCR), and triode for alternating current (TRIAC).

The DC power supply 134 takes DC power from the DC power combiner 106 to supply DC power to the internal electronics. The DC power supplies to be described in FIGS. 6 to 8 perform the similar functions.

The AC power and related AC loads in the embodiments herein can be single-phase, split-phase, or 3-phase. The 2 AC wires in the drawing are there to show the concept and method.

The load detector 124 as well as the ones to be described in FIGS. 6 to 8 are electronic circuits that can detect the impedance of the connected AC loads. If no AC power is detected on the off-grid AC powerline 112, the load detector checks the impedance of the corresponding off-grid AC powerline to determine if the connected AC loads are within certain specifications. The load detector in the embodiments herein can be designed using standard LRC meter impedance measurement circuits and mechanisms such as those described in the book, "The Measurement of Lumped Parameter Impedance: A Metrology Guide" published by University of Michigan Library in January 1974.

FIG. 6 is a block diagram illustrating an m-channel AC assisted off-grid power inverter that inverts the DC power from multiple DC sources to AC power, combines its generated AC power with input AC power, and sends the combined AC power to an off-grid AC circuit to power AC loads, according to an embodiment of this invention.

The m-channel AC assisted off-grid power inverter comprises m DC-DC boost converters 161, 162, . . . 164, a DC power combiner 166, a DC-AC inverter 168, a load interface circuit 170, an off-grid AC output powerline 172, an AC electric relay 174, a voltage and current sensing circuit 176, an AC power supply 178, a power management module 180, a digital microcontroller 182, a load detector 184, a line sensing circuit 186, communication circuits and wires 188, an AC input port and powerline 190, and a DC power supply 194. The off-grid AC output powerline 172 is connected to an off-grid AC circuit and AC loads 192.

The AC electric relay 174 can be open or closed by the microcontroller 182 via PMM 180 and AC power supply 178. The relay is used to isolate the inverter's off-grid AC output powerline 172 from the AC input port and powerline 190. In Mode 1 (Grid AC Only Mode), the AC electric relay 174 is closed by the AC power supply 178 so that the grid AC can start and run the loads. In Mode 2 (Solar Only Mode), the inverter's input port is not connected to the grid AC or the grid is down, the AC electric relay 174 is open by the microcontroller 182. This is to protect the inverter's off-grid AC output powerline 172 by isolating it from the AC input port and powerline 190. In Mode 3 (Combined Power Mode), the AC electric relay 174 is closed by the microcontroller 182 so the AC power generated by the inverter and the input power from the grid can be combined to run the AC loads.

The line sensing circuit 186 connected to the off-grid AC output powerline 172 is used to detect if there is AC power on the off-grid AC output powerline 172. As an off-grid inverter, it will not generate power if AC is detected on the off-grid AC output powerline 172. This could happen if someone connects the off-grid inverter's output port to the grid. The line sensing circuit 186 is also used to measure the AC output voltage and current as real-time feedback signals for the inverter to regulate the AC output voltage.

The voltage and current sensor (V&I sensor) 176 and power management module (PMM) 180 are used to monitor the flow of AC current coming from the AC input port. In Mode 1 (Grid AC Only Mode), the V&I sensor 176 detects AC current flowing from the grid. In Mode 2 (Solar Only Mode), the V&I sensor detects no AC current flowing from the grid. In Mode 3 (Combined Power Mode), the V&I sensor 176 expects to measure zero or some AC current flowing from the grid. If the V&I sensor and PPM 180 sense that the AC current may flow to the grid, the inverter will reduce power production to assure that no power is sent to the grid. In this case, the AC current from the grid will be zero.

During normal operating conditions, the power from DC sources 157, 158, . . . , 160 is delivered to the corresponding DC-DC boost converters 161, 162, . . . , 164 respectively. The DC power is then combined in the DC power combiner 166. The combined DC power is then inverted by the DC-AC inverter 168 to AC power. In Mode 2 (Solar Only Mode), the AC power generated by the inverter goes through a load interface circuit 170 and runs the AC loads 192 through the off-grid AC output powerline 172. In Mode 3 (Combined Power Mode), the AC power generated by the inverter and the input power from the grid is combined and runs the AC loads 192 through the off-grid AC output powerline 172. The AC output voltage is regulated based on inverter's rated output voltage such as 120 VAC as well as the AC current flow direction monitored by the V&I sensor 176 and power management module 180. Since the input AC voltage from the grid should be close to the rated output voltage of the inverter and there should always be sufficient combined power to run the AC loads, the inverter can simply ramp up or down its generated power towards the goal of (1) maximizing solar power production and (2) minimizing the grid power consumption.

In Mode 2 (Solar Only Mode), the function of regulating AC output voltage is achieved by the microcontroller with its supporting circuits and software to perform the following: (1) measuring the AC output voltage in real-time; (2) comparing it with the rated AC output voltage setpoint such as 120V; and (3) adjusting the AC output current or output power until the output voltage is regulated around its setpoint within a specified deadband. More specifically, if the AC output voltage is higher than its setpoint, the microcontroller will reduce the output current by decreasing the duty-cycle of the pulse-width-modulation (PWM) of the DC converter. If the AC output voltage is lower than its setpoint, it will increase the duty-cycle of PWM to increase the output current. If the output voltage is within the deadband of its setpoint such as 120V+/−1V, the microcontroller will not make PWM duty-cycle adjustments to keep the output current and output power stable. Based on Ohm's Law, the AC output voltage is proportional to the AC output current so it can be regulated accordingly.

The digital microcontroller 182 is used to perform a number of tasks including: (1) monitoring the DC input voltage from the DC sources; (2) monitoring the DC boost voltage from each DC-DC boost converter, (3) measuring the input voltage and current, and calculating DC input power for each input channel; (4) performing maximum power point tracking (MPPT) for each DC source; (5) performing DC-AC inversion, AC power synchronization, and AC output current control; (6) monitoring AC current and voltage for generated power amount and status; (7) performing logic controls such as AC powerline switching and isolation; (8) monitoring the off-grid AC powerline status, (9) detecting the off-grid AC circuit status and AC loads; (10) monitoring the status of AC input port and connected grid AC or AC source; (11) controlling the AC relay based on the operating Mode 1, 2, or 3; (12) combining the generated AC power with the input AC power; (13) switching operating conditions depending on the condition of the off-grid circuits and connected loads; and (14) regulating AC output voltage. The digital microcontroller described in FIG. 5 works very similarly.

FIG. 7 is a block diagram illustrating an m-channel AC assisted off-grid master inverter that inverts the DC power from multiple DC sources to AC power, combines its generated AC power with input AC power, connects to one or multiple off-grid slave inverters through AC wires and signal lines, and sends the total combined AC power to an off-grid AC circuit to power AC loads, according to an embodiment of this invention.

The m-channel AC assisted off-grid master inverter comprises m DC-DC boost converters 201, 202, . . . 204, a DC power combiner 206, a DC-AC inverter 208, a load interface circuit 210, an off-grid AC output powerline 212, an AC electric relay 214, a voltage and current sensing circuit 216, an AC power supply 218, a power management module 220, a digital microcontroller 222, a load detector 224, a line sensing circuit 226, communication circuits and wires 228, an AC input port and powerline 230, and a DC power supply 234. The off-grid AC output powerline 212 is connected to an off-grid AC circuit and AC loads 232. The m-channel AC assisted off-grid master inverter further comprises signal lines 236 that are connected to one or multiple off-grid slave inverters, and an additional off-grid AC output powerline 234 that is connected to the off-grid AC output powerline(s) of one or multiple slave inverters.

The AC electric relay 214 can be open or closed by the microcontroller 222 via PMM 220 and AC power supply 218. The relay is used to isolate the inverter's off-grid AC output powerline 212 from the AC, input port and powerline 230. In Mode 1 (Grid AC Only Mode), the AC electric relay 214 is closed by the AC power supply 218 so that the grid AC can start and run the loads. In Mode 2 (Solar Only Mode), the inverter's input port is not connected to the grid AC or the grid is down, the AC electric relay 214 is open by the microcontroller 222. This is to protect the inverter's off-grid AC output powerline 212 by isolating it from the AC input port and powerline 230. In Mode 3 (Combined Power Mode), the AC electric relay 214 is closed by the digital microcontroller 222 and AC power supply 218 so the AC power generated by the inverter and the input power from the grid can be combined to run the AC loads.

The line sensing circuit 226 connected to the off-grid AC output powerline 212 is used to detect if there is AC power on the off-grid AC output powerline 212. As an off-grid inverter, it will not generate power if AC is detected on the off-grid AC output powerline 212. This could happen if someone connects the off-grid inverter's output port to the grid. The line sensing circuit 226 is also used to measure the AC output voltage and current as real-time feedback signals for the inverter to regulate the AC output voltage.

The voltage and current sensor (V&I sensor) 216 and power management module (PMM) 220 are used to monitor the flow of AC current coming from the AC input port. In Mode 1 (Grid AC Only Mode), the V&I sensor 216 detects AC current flowing from the grid. In Mode 2 (Solar Only Mode), the V&I sensor detects no AC current flowing from the grid. In Mode 3 (Combined Power Mode), the V&I sensor 216 expects to measure zero or some AC current flowing from the grid. If the V&I sensor and PPM 220 sense that the AC current may flow to the grid, the inverter will reduce power production to assure that no power is sent to the grid. In this case, the AC current from the grid will be zero.

The off-grid AC output powerline 212 is connected to the off-grid AC output powerline 234 in parallel. Electrically, these two powerlines are the same thing. The AC output of the master inverter is connected to the AC loads through the off-grid AC powerline of one or multiple slave inverters. FIG. 4 illustrates how the master inverter is connected to the AC loads. Please note that the AC loads 232 and the AC loads 268 to be described in FIG. 8 are actually the same.

During normal operating conditions, the power from DC sources 197, 198, . . . , 200 is delivered to the corresponding DC-DC boost converters 201, 202, . . . , 204 respectively. The DC power is then combined in the DC power combiner 206. The combined DC power is then inverted by the DC-AC inverter 208 to AC power. In Mode 1 (Grid AC Only Mode), the AC electric relay 214 is closed by the AC power supply 218 so that the grid AC can start and run the loads. In this case, there is no DC power from the DC sources and the inverter is down but the AC loads can operate normally with the grid power. In Mode 2 (Solar Only Mode), the AC power generated by the inverter goes through a load interface circuit 210 and runs the AC loads 232 through the off-grid AC output powerline 212. In Mode 3 (Combined Power Mode), the AC power generated by the inverter and the input power from the grid is combined and runs the AC loads 232 through the off-grid AC output powerline 212. The AC output voltage is regulated based on inverter's rated output voltage such as 120 VAC as well as the AC current flow direction monitored by the V&I sensor 216 and power management module 220. Since the input AC voltage from the grid should be close to the rated output voltage of the inverter and there should always be sufficient combined power to run the AC loads, the master inverter can simply ramp up or down its generated power towards the goal of (1) maximizing solar power production and (2) minimizing the grid power consumption. In addition, the master inverter sends power ramping signals to the connected slave inverters to coordinate the power ramping functions to avoid potential power ramping conflicts among the inverters.

The digital microcontroller 222 is used to perform a number of tasks including: (1) monitoring the DC input voltage from the DC sources; (2) monitoring the DC boost voltage from each DC-DC boost converter; (3) measuring the input voltage and current, and calculating DC input power for each input channel; (4) performing maximum power point tracking (MPPT) for each DC source; (5) performing DC-AC inversion, AC power synchronization, and AC output current control; (6) monitoring AC current and voltage for generated power amount and status; (7) performing logic controls such as AC powerline switching and isolation; (8) monitoring the off-grid AC powerline status, (9) detecting the off-grid AC circuit status and AC loads; (10) monitoring the status of AC input port and connected grid AC or AC source; (11) controlling the AC relay based on the operating Mode 1, 2, or 3; (12) combining the generated AC power with the input AC power; (13) switching operating conditions depending on the condition of the off-grid circuits and connected loads; (14) regulating AC output voltage; and (15) sending signals to the connected slave inverters to synchronize AC output waveforms and coordinate power ramping functions.

FIG. 8 is a block diagram illustrating an m-channel AC assisted off-grid slave inverter that inverts the DC power from multiple DC sources to AC power, connects to an off-grid master inverter through AC wires and signal lines, and provides its output AC power to an off-grid AC circuit to power AC loads along with the master inverter, according to an embodiment of this invention.

The m-channel AC assisted off-grid slave inverter comprises m DC-DC boost converters 251, 252, . . . 254, a DC power combiner 256, a DC-AC inverter 258, a load interface circuit 260, a line sensing circuit 262, a digital microcontroller 264, an off-grid AC output powerline 266, and a DC power supply 272. The off-grid AC output powerline 266 is connected to an off-grid AC circuit and AC loads 268. The m-channel AC assisted off-grid slave inverter further comprises signal lines 274 that are connected to an AC assisted off-grid master inverter, and an additional off-grid AC output powerline 270 that is connected to the AC output powerline of the master inverter.

The off-grid AC output powerline 266 is connected to the off-grid AC output powerline 270 in parallel. Electrically, these two powerlines are the same thing. The AC output of the slave inverter is connected to the AC loads through the off-grid AC powerline 266. The off-grid AC output powerline 270 is used to connect the AC output of the slave inverter with the master inverter or to another slave inverter in the daisy-chain. Referring to FIG. 4, if the slave inverter described in FIG. 8 is the slave inverter n, where n=1, the AC output powerline 270 connects to the AC output powerline of the master inverter. If n=2 or n>2, the AC output powerline 270 connects to the AC output powerline of a daisy-chained slave inverter. If the slave inverter described in FIG. 8 is the slave inverter 1, where n>1, the AC powerline 266 in FIG. 8 does not connect to the AC loads 268 directly. Instead, the AC powerline 266 connects to its daisy-chained slave inverter 2.

During normal operating conditions, the power from DC sources 247, 248, . . . , 250 is delivered to the corresponding DC-DC boost converters 251, 252, . . . , 254 respectively. The DC power is then combined in the DC power combiner 256. The combined DC power is then inverted by the DC-AC inverter 258 to AC power. In Mode 1 (Grid AC Only Mode), there is no DC power from the DC sources and the inverter is down but the AC loads can operate normally with the grid power. Please note that the input power from the grid is fed in from an AC input port of the master inverter. Since the output powerlines of all inverters are connected together, the input power from the grid is passed through the powerlines of all connected inverters to the off-grid circuit and AC loads. In Mode 2 (Solar Only Mode), the AC power generated by the slave inverter goes through a load interface circuit 260 and runs the AC loads 268 through the off-grid AC output powerline 266 along with the off-grid master inverter and other connected slave inverters. In Mode 3 (Combined Power Mode), the AC power generated by the connected master inverter and slave inverters is combined with the input power from the grid, and the total combined power runs the AC loads 268 through the off-grid AC output powerline 266. The AC output voltage is regulated based on inverter's rated output voltage such as 120 VAC as well as power ramping signals sent from the master inverter. In this case, the master inverter manages the power level of all the inverters and assures that no power is sent to the grid.

The digital microcontroller 264 is used to perform a number of tasks including: (1) monitoring the DC input voltage from the DC sources; (2) monitoring the DC boost voltage from each DC-DC boost converter; (3) measuring the input voltage and current, and calculating DC input power for each input channel; (4) performing maximum power point tracking (MPPT) for each DC source; (5) performing DC-AC inversion, AC power synchronization, and AC output current control; (6) monitoring AC current and voltage for generated power amount and status; (7) performing logic controls such as AC powerline switching and isolation; (8) monitoring the off-grid AC powerline status; (9) detecting the off-grid AC circuit status and AC loads; (10) combining the generated AC power with the input AC power; (11) switching operating conditions depending on the condition of the off-grid circuits and connected loads; (12) regulating AC output voltage; (13) receiving signals from the connected master inverter to synchronize its AC output waveform with the leading AC waveform generated by the master inverter, and (14) ramping its power production up or down based on the power ramping signals from the master inverter.

The applying organization of this patent has built commercial 4-channel on-grid power inverters for on-grid applications, 4-channel off-grid power inverters for off-grid applications, 4-channel on/off-grid power inverters for applications where grid power is not stable, and 4-channel dual-output off-grid power inverters to power different types of AC loads. The AC assisted off-grid power inverters described in this patent application enhance the unique design and concept of multi-channel power inverters.

Compared with traditional off-grid solar systems, the described off-grid solar systems with assisted grid power or AC source have many features and benefits including: (1) able to run AC loads with solar power only, grid or external AC power only, or combined power; (2) no batteries needed; (3) panel level MPPT to solve partial shading problems and maximize solar power production; (4) can start heavy loads with assisted AC power and run with only solar power; (5) can avoid all the headaches of an on-grid solar system; (6) no high voltage or high current DC so the system is intrinsically safe; (7) easier to install and maintain; and (8) more cost-effective. The innovative AC assisted off-grid solar power inverters and systems are ideal for any area where on-grid solar is too costly or no longer welcomed.

The invention claimed is:

1. An AC assisted off-grid solar system for providing AC power to an off-grid AC circuit from a plurality of individual DC power sources each having a DC output port, comprising:
   a) a plurality of AC assisted off-grid power inverters, each having one or a plurality of DC input ports, an AC input port, and an AC output port;
   b) the AC output port of each inverter being connected in a daisy chain to the AC input port of the next inverter, except for the AC input port of the first inverter being connected to an electric grid or an AC source, and the AC output port of the last inverter being connected to an off-grid AC circuit, a load being attached to the off-grid AC circuit; and
   c) the first inverter connected to an electric grid or an AC source through its AC input port is the AC assisted off-grid master inverter and others are AC assisted off-grid slave inverters.

2. The system of claim 1, in which the AC assisted off-grid master inverter is adapted to communicate with one or more of the AC assisted off-grid slave inverters through the AC input ports of each of the one or more of the AC assisted off-grid slave inverters and to inform the one or more of the AC assisted off-grid slave inverters to synchronize an AC output waveform of each corresponding slave inverter with a leading AC waveform generated by the master inverter, and to ramp power production of each corresponding slave inverter up or down based on power ramping signals from the master inverter.

3. The system of claim 1, wherein the AC assisted off-grid master inverter and the AC assisted off-grid slave inverters are adapted to work in a combined power mode to combine input AC power received through the AC input port of the AC assisted off-grid master inverter with AC power generated by the inverters, and to supply the combined AC power through an off-grid AC output port of a last one of the slave inverters to power AC loads in the off-grid AC circuit.

4. The system of claim 1, where the AC assisted off-grid master inverter and the AC assisted off-grid slave inverters are adapted to work in an AC only mode to transfer AC input power received through the AC input port of the AC assisted off-grid master inverter through an off-grid AC output port of a last one of the slave inverters to power AC loads in the off-grid AC circuit when there is no DC input power or when the DC input power is insufficient for the inverters to generate AC power.

5. The system of claim 1, where the AC assisted off-grid master inverter and AC assisted off-grid slave inverters are adapted to work in a solar only mode to supply AC power generated by the inverters through an off-grid AC output port of a last one of the slave inverters to power AC loads in the off-grid AC circuit when there is no AC input power.

6. The system of claim 1, wherein when no AC input power is supplied through the AC input port of the AC assisted off-grid master inverter, the AC assisted off-grid master inverter and AC assisted off-grid slave inverters do not generate AC power.

7. The system of claim 1, in which the AC assisted off-grid master inverter comprising:
   a) for the off-grid AC output port, an internal AC powerline that allows the generated AC power or AC input power or combined AC power to be sent to corresponding AC loads through an external AC powerline;
   b) an AC electric relay arranged to isolate the AC input port and off-grid AC output port;
   c) for each DC input port, a DC-DC boost converter arranged to convert the voltage of a DC power source to a higher DC voltage suitable for inversion;
   d) a DC power combiner connected to the DC-DC boost converters for combining the DC output from all DC-DC boost converters and allowing the DC-DC boost converters to connect in parallel so that all DC currents are added together, the DC power combiner being connected to the DC-AC inverter;
   e) a load interface circuit connected to the DC-AC inverter and to the internal AC powerlines, said load interface circuit being arranged to filter high-frequency components out of the DC-AC inverter's AC output;
   f) a load detector connected to the internal and external AC powerlines for the off-grid AC output port, and arranged to detect the impedance of the connected AC loads;
   g) a voltage and current sensor circuit, an AC power supply, and a power management module arranged to monitor the flow of AC current coming from the AC input port;
   h) a digital microcontroller connected to the DC-DC boost converters, DC-AC inverter, load interface circuit, power management module, and load detector, said microcontroller arranged to monitor the DC boost voltage, control the DC-DC boost converters, perform maximum power point tracking (MPPT), control DC-AC inversion, control AC synchronization when combining the input AC power with the generated AC power, monitor AC output current and voltage, open or close the AC electric relay through the power management module and the AC power supply, detect off-grid AC circuit status, check the impedance of the AC load in the off-grid circuit to determine if it is within predetermined specifications, switch among the solar only mode, AC only mode, and combined power mode, regulate AC output voltage when in solar only mode, and send signals to the connected slave inverters to synchronize AC output waveforms and coordinate power ramping functions;
   i) a line sensing circuit connected to the AC powerlines and the microcontroller, and arranged to detect if there is AC power on the powerlines, and measure the AC output voltage and current as real-time feedback signals for the inverter to regulate the AC output voltage when working in solar only mode;
   j) a power supply connected to said DC power combiner and arranged to supply DC power to the electronic components of the power inverter;
   k) signal lines that connect to one or multiple off-grid slave inverters; and
   l) an additional off-grid AC output powerline that is connected to the off-grid AC output powerlines of one or multiple slave inverters.

8. The system of claim 1, in which the AC assisted off-grid slave inverters comprising:

a) for the off-grid AC output port, an internal AC powerline that allows the generated AC power or AC input power or combined AC power to be sent to corresponding AC loads through an external AC powerline;
b) for each DC input port, a DC-DC boost converter arranged to convert the voltage of a DC power source to a higher DC voltage suitable for inversion;
c) a DC power combiner connected to the DC-DC boost converters for combining the DC output from all DC-DC boost converters and allowing the DC-DC boost converters to connect in parallel so that all DC currents are added together, the DC power combiner being connected to the DC-AC inverter;
d) a load interface circuit connected to the DC-AC inverter and to the internal AC powerlines, said load interface circuit being arranged to filter high-frequency components out of the DC-AC inverter's AC output;
e) a digital microcontroller connected to the DC-DC boost converters, DC-AC inverter, line sensing circuit, and load interface circuit, said microcontroller arranged to monitor the DC boost voltage, control the DC-DC boost converters, perform maximum power point tracking (MPPT), control DC-AC inversion, receive signals from the connected master inverter to synchronize its AC output waveform with the leading AC waveform generated by the master inverter, and ramp its power production up or down based on the power ramping signals from the master inverter;
f) a line sensing circuit connected to the AC powerlines and the microcontroller, and arranged to detect if there is AC power on the powerlines, and measure the AC output voltage and current as real-time feedback signals for the inverter to regulate the AC output voltage when working in solar only mode;
g) a power supply connected to said DC power combiner and arranged to supply DC power to the electronic components of the power inverter;
h) signal lines that are connected to an AC assisted off-grid master inverter; and
i) an off-grid AC output powerline that is connected to the AC output powerline of the master inverter.

9. The system of claim 1, whereby said system is incrementally scalable by removing one or more DC power sources from or adding one or more power sources to the plurality of DC power sources and removing one or more inverters from or adding one or more inverters to the plurality of AC assisted off-grid power inverters connected in said daisy chain.

10. A method of building an AC assisted off-grid solar system, comprising:
a) providing a plurality of DC power sources and a plurality of AC assisted off-grid power inverters, each having an AC input port, an AC output port, and at least one DC input port;
b) connecting at least one of said DC power sources, respectively, to at least one of said DC input ports;
c) daisy-chaining at least two of said inverters, said AC output port of each inverter being connected in a daisy chain to the AC input port of the next inverter, except for the AC input port of the first inverter being connected to an electric grid or an AC source, and the AC output port of the last inverter being connected to AC loads; and
d) supplying AC power to AC loads through the AC output port of the last inverter when AC input power or DC input power or both AC and DC input power are available.

11. The system of claim 10, where the plurality of AC assisted off-grid inverters are adapted to work in a combined power mode to combine input AC power received through the AC input port of the AC assisted off-grid master inverter with AC power generated by the inverters, and to supply the combined AC power to power AC loads.

12. The method of claim 10, where the plurality of AC assisted off-grid inverters are adapted to work in an AC only mode to transfer AC input power received through the AC input port of the AC assisted off-grid master inverter to power AC loads when there is no DC input power or when DC input power is insufficient for the inverters to generate AC power.

13. The method of claim 10, where the plurality of AC assisted off-grid inverters are adapted to work in a solar only mode to supply AC power generated by the inverters to power AC loads when there is no AC input power.

14. The method of claim 10, wherein when no AC input power is supplied through the AC input port of the AC assisted off-grid mater inverter, the plurality of AC assisted off-grid inverters do not generate AC power.

\* \* \* \* \*